(12) United States Patent
Mc Kenzie

(10) Patent No.: US 6,385,876 B1
(45) Date of Patent: May 14, 2002

(54) LOCKABLE LICENSE PLATE COVER ASSEMBLY

(76) Inventor: John A. Mc Kenzie, 1745 NW. 151st St., Opa Locka, FL (US) 33054

( * ) Notice: Subject to any disclaimer, the term of this patent is extended or adjusted under 35 U.S.C. 154(b) by 0 days.

(21) Appl. No.: 09/540,503

(22) Filed: Mar. 31, 2000

(51) Int. Cl.[7] ............................. G09F 7/06; F16B 41/00
(52) U.S. Cl. ............................. 40/201; 70/230; 40/202
(58) Field of Search .................... 40/20, 200, 202, 40/203, 209; 70/230, 229, 231, 232

(56) References Cited

U.S. PATENT DOCUMENTS

| | | | | |
|---|---|---|---|---|
| 1,573,113 A | * | 2/1926 | Irie ........................... | 40/202 |
| 1,629,060 A | | 5/1927 | Wolfson | |
| 1,942,176 A | * | 1/1934 | Lowe ......................... | 70/230 |
| 2,134,594 A | * | 10/1938 | Adelenis ..................... | 40/202 |
| 2,696,058 A | * | 12/1954 | Beyer ......................... | 40/202 |
| 2,710,475 A | * | 6/1955 | Salzmann ..................... | 40/202 |
| 3,304,642 A | * | 2/1967 | Dardis ......................... | 40/209 |
| 3,432,954 A | * | 3/1969 | Ford ........................... | 40/202 |
| 3,600,912 A | * | 8/1971 | Foreman ....................... | 70/230 |
| 4,182,062 A | * | 1/1980 | Krokos et al. ................. | 40/209 |
| 4,891,895 A | * | 1/1990 | DeLaquil, Jr. ................ | 40/209 |
| 5,012,602 A | | 5/1991 | Storey | |
| 5,381,618 A | | 1/1995 | Singleton | |
| 5,392,619 A | | 2/1995 | Dunaway | |
| 5,404,664 A | | 4/1995 | Brooks et al. | |
| D377,777 S | | 2/1997 | Kheyfets | |
| 5,659,986 A | * | 8/1997 | Simmons ....................... | 40/202 |
| 5,983,539 A | * | 11/1999 | Martin et al. ................. | 40/202 |
| 6,047,574 A | * | 4/2000 | Kozlowski, Jr. et al. ......... | 70/259 |

* cited by examiner

Primary Examiner—Lynne H. Browne
Assistant Examiner—Kenn Thompson

(57) ABSTRACT

A vehicular license plate holder is provided including a frame for removably receiving a license plate and a transparent plate positioned thereon. Also included is at least one locking assembly for preventing the removal of the license plate from the frame.

11 Claims, 2 Drawing Sheets

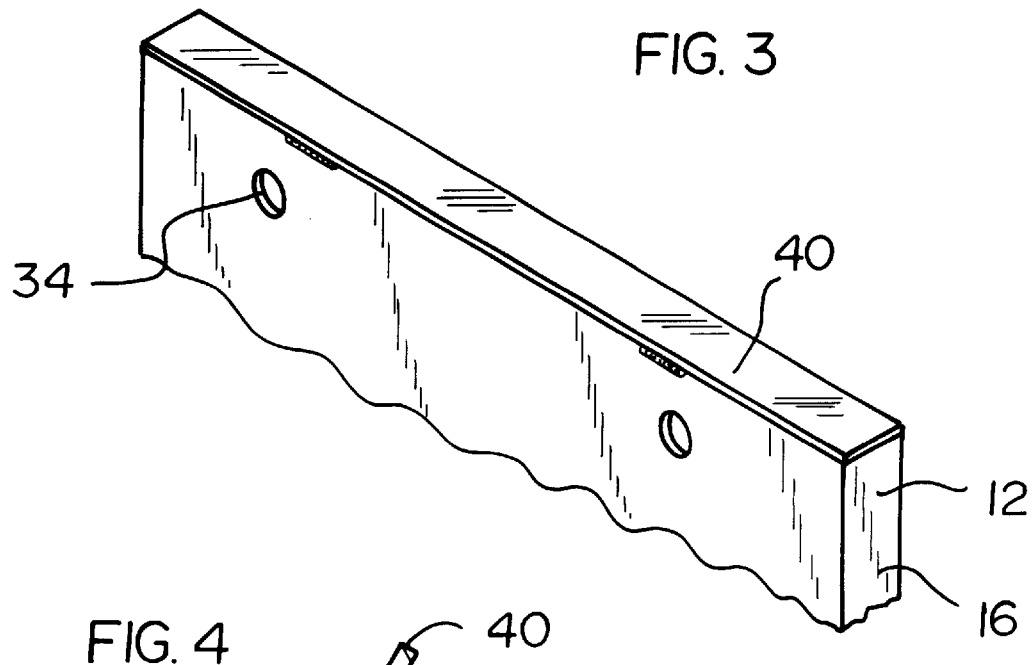
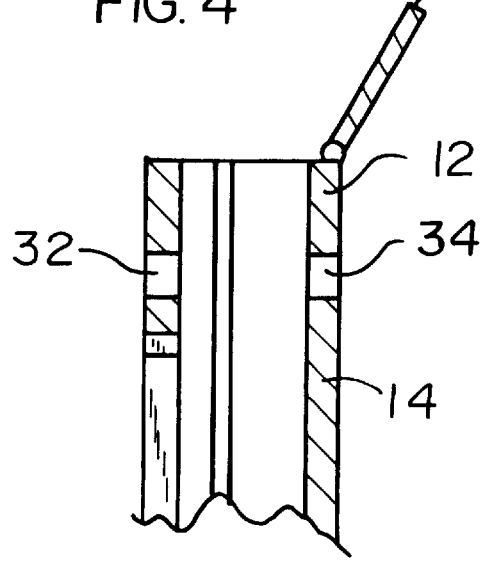
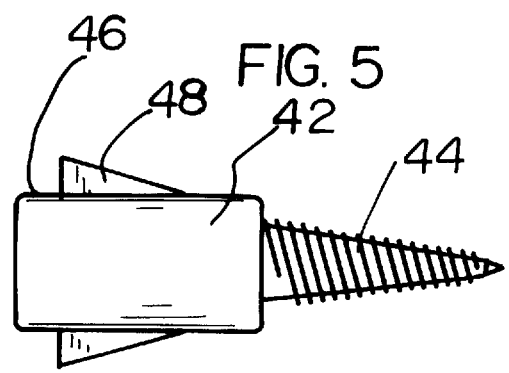

LOCKABLE LICENSE PLATE COVER ASSEMBLY

BACKGROUND OF THE INVENTION

1. Field of the Invention

The present invention relates to vehicle license plate mounts and more particularly pertains to a new lockable license plate cover assembly for preventing theft of a vehicular license plate.

2. Description of the Prior Art

The use of vehicle license plate mounts is known in the prior art. More specifically, vehicle license plate mounts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,012,602; 1,629,060; 5,392,619; 5,404,664; 5,381,618; and U.S. Pat. No. Des. 377,777.

In these respects, the lockable license plate cover assembly according to the present invention substantially departs from the conventional concepts and designs of the prior art, and in so doing provides an apparatus primarily developed for the purpose of preventing theft of a vehicular license plate.

SUMMARY OF THE INVENTION

In view of the foregoing disadvantages inherent in the known types of vehicle license plate mounts now present in the prior art, the present invention provides a new lockable license plate cover assembly construction wherein the same can be utilized for preventing theft of a vehicular license plate.

The general purpose of the present invention, which will be described subsequently in greater detail, is to provide a new lockable license plate cover assembly apparatus and method which has many of the advantages of the vehicle license plate mounts mentioned heretofore and many novel features that result in a new lockable license plate cover assembly which is not anticipated, rendered obvious, suggested, or even implied by any of the prior art vehicle license plate mounts, either alone or in any combination thereof.

To attain this, the present invention generally comprises a frame having a rear face with a substantially planar rectangular configuration defined by a front surface, a rear surface, and a periphery. Such periphery is in turn defined by a top edge, a bottom edge, and a pair of side edges. The frame further includes a side wall integrally formed on the periphery of the rear face and extending forwardly therefrom for defining a bottom face and a pair of side faces forming an interior space and an open top. The frame further includes an inwardly extending lip integrally formed on an outboard peripheral edge of the side wall and extending inwardly therefrom. Such inwardly extending lip is equipped with an inboard peripheral edge defined by a linear bottom edge, a pair of linear side edges, and a top edge. As shown in FIG. 1, the top edge of the inwardly extending lip has a linear central extent and a pair of side extents. These side extents each comprise a rectangular frame portion and a circular bore portion with a predetermined diameter. The rear face of the frame has a pair of holes formed therein adjacent to the top edge of the rear face and in alignment with the bore portions of the inwardly extending lip of the frame. Next provided is a pair of divider strips each having a substantially planar rectangular configuration. Each of the divider strips is integrally formed on an inner surface of one of the side faces of the side wall. An inboard edge of each divider strip is coextensive with one of the side edges of the inwardly extending lip of the frame. By this structure, the divider strips serve for defining a rear compartment adapted for removably receiving a license plate therein and a front compartment, as shown in FIGS. 2 & 4. Also included is a transparent plate with a substantially planar rectangular configuration having a shape and a size similar to that of the rear face of the frame. In use, the transparent plate is adapted for being removably received within the front compartment of the frame. FIGS. 1, 2 & 4 show a lid having a substantially planar rectangular configuration with a size and shape similar to that of the bottom face of the side wall of the frame. An elongated side edge of the lid is pivotally coupled to the top edge of the rear face of the frame for allowing selective access to the interior space of the frame. Finally, a pair of locking screws are provided each including a threaded substantially conical inboard extent and a substantially cylindrical outboard extent. The outboard extent is integrally coupled to the inboard extent in coaxial relationship therewith. The outboard extent has a pair of linear slots formed in diametrically opposed sides thereof. A pair of substantially planar triangular locking tabs are slidably mounted within the slots of the outboard extent and movable within a plane including an axis of the outboard extent. The locking tabs are capable of a retracted orientation such that the outboard extent has an overall width of less than the predetermined diameter. The tabs are further movable to an extended orientation such that the outboard extent has an overall width greater than the predetermined diameter. Situated on an end of the outboard extent of each locking screw is a key hole for allowing the transfer of the locking tabs between the retracted orientation and the extended orientation. In use, the inboard extents of the locking screws are adapted to be extended through the bores portions and holes of the frame and engaged with a vehicle. Thereafter, the locking tabs may be selectively extended to prevent the removal of the locking screws from the frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lockable license plate cover assembly apparatus and method which has many of the advantages of the vehicle license plate mounts mentioned heretofore and many novel features that result in a new lockable license plate cover assembly which is not anticipated, rendered obvious, suggested, or even implied by any of the prior art vehicle license plate mounts, either alone or in any combination thereof.

It is another object of the present invention to provide a new lockable license plate cover assembly which may be easily and efficiently manufactured and marketed.

It is a further object of the present invention to provide a new lockable license plate cover assembly which is of a durable and reliable construction.

An even further object of the present invention is to provide a new lockable license plate cover assembly which is susceptible of a low cost of manufacture with regard to both materials and labor, and which accordingly is then susceptible of low prices of sale to the consuming public, thereby making such lockable license plate cover assembly economically available to the buying public.

Still yet another object of the present invention is to provide a new lockable license plate cover assembly which provides in the apparatuses and methods of the prior art some of the advantages thereof, while simultaneously overcoming some of the disadvantages normally associated therewith.

Still another object of the present invention is to provide a new lockable license plate cover assembly for preventing theft of a vehicular license plate.

Even still another object of the present invention is to provide a new lockable license plate cover assembly that includes a frame for removably receiving a license plate and a transparent plate positioned thereon. Also included is at least one locking assembly for preventing the removal of the license plate from the frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the lid of the present invention.

FIG. 4 is a side cross-sectional view of the present invention.

FIG. 5 is a detailed side view of one of the locking screws of the present invention.

DESCRIPTION OF THE PREFERRED EMBODIMENT

Figure 1:
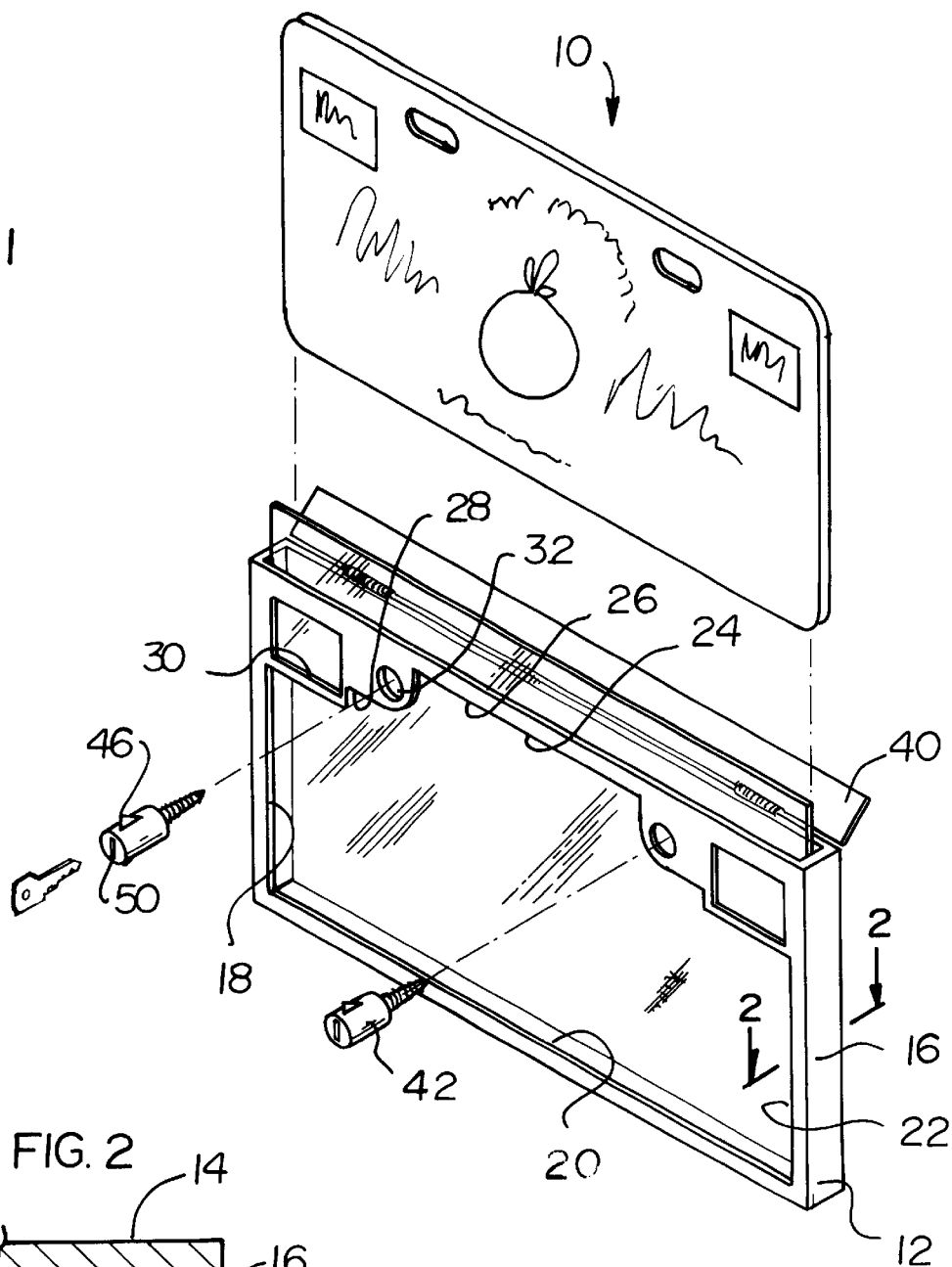
FIG. 1 is an exploded perspective view of a new lockable license plate cover assembly according to the present invention.

With reference now to the drawings, and in particular to FIGS. 1 through 5 thereof, a new lockable license plate cover assembly embodying the principles and concepts of the present invention and generally designated by the reference numeral 10 will be described.

The present invention, designated as numeral 10, includes a steel frame 12 having a rear face 14 with a substantially planar rectangular configuration defined by a front surface, a rear surface, and a periphery. Such periphery is in turn defined by a top edge, a bottom edge, and a pair of side edges. The frame further includes a side wall 16 integrally formed on the periphery of the rear face and extending forwardly therefrom for defining a bottom face and a pair of side faces forming an interior space and an open top.

The frame further includes an inwardly extending lip 18 integrally formed on an outboard peripheral edge of the side wall and extending inwardly therefrom. Such inwardly extending lip is equipped with an inboard peripheral edge defined by a linear bottom edge 20, a pair of linear side edges 22, and a top edge 24. As shown in FIG. 1, the top edge of the inwardly extending lip is part of a planar rectangular member extending between the side faces of the side wall of the frame. Such top edge of the inwardly extending lip has a linear central extent 26 and a pair of side extents 28. These side extents each comprise a rectangular frame portion 30 and a circular bore portion 32 with a predetermined diameter. The rear face of the frame has a pair of holes 34 formed therein adjacent to the top edge of the rear face and in alignment with the bore portions of the inwardly extending lip of the frame.

Figure 2:
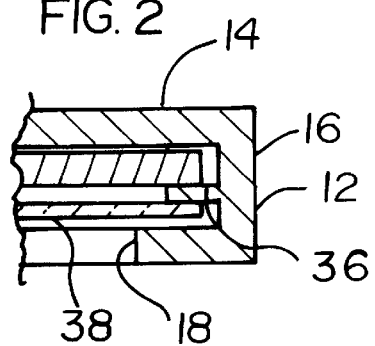
FIG. 2 is a side cross-sectional view of the present invention taken along line 2—2 shown in FIG. 1.

Next provided is a pair of divider strips 36 each having a substantially planar rectangular configuration. Each of the divider strips is integrally formed on an inner surface of one of the side faces of the side wall. An inboard edge of each divider strip is coextensive with one of the side edges of the inwardly extending lip of the frame. By this structure, the divider strips serve for defining a rear compartment adapted for removably receiving a license plate therein and a front compartment, as shown in FIGS. 2 & 4. Ideally, the rear compartment has a depth of at least twice that of the front compartment.

When the license plate is positioned within the frame, the frame portions of the inwardly extending lip are positioned in front of the license plate and encompass rectangular parts of the license plate on which a sticker is conventional adhered. Further, the bore portions are preferably aligned with conventional laterally spaced bores or slots of the license plate.

Also included is a transparent plate 38 with a substantially planar rectangular configuration having a shape and a size similar to that of the rear face of the frame. In use, the transparent plate is adapted for being removably received within the front compartment of the frame. The transparent plate has a pair of apertures formed therein which remain in alignment with the bore portions of the frame in use. For reasons that will soon become apparent, the apertures of the transparent plate preferably have a diameter which is greater than the predetermined diameter set forth hereinabove.

FIGS. 1, 2 & 4 show a lid 40 having a substantially planar rectangular configuration with a size and shape similar to that of the bottom face of the side wall of the frame. An elongated side edge of the lid is pivotally coupled to the top edge of the rear face of the frame for allowing selective access to the interior space of the frame. As an option, a spring may be mounted between the lid and the frame for urging the lid into a closed orientation.

Finally, a pair of locking screws 42 are provided each including a threaded substantially conical inboard extent 44 and a substantially cylindrical outboard extent with the predetermined diameter. The outboard extent is integrally coupled to the inboard extent in coaxial relationship therewith. The outboard extent has a pair of linear slots 46 formed in diametrically opposed sides thereof. A pair of substantially planar triangular locking tabs 48 are slidably mounted within the slots of the outboard extent and movable within a plane including an axis of the outboard extent. Ideally, a vertically oriented linear edge of the triangular locking tab is positioned adjacent to an end of the outboard extent of the locking screw. Note FIG. 5. In the alternative, the locking tabs may take on any other desired shape. The locking tabs are capable of a retracted orientation such that the outboard extent has an overall width of less than the predetermined diameter. The tabs are further movable to an extended orientation such that the outboard extent has an overall width greater than the predetermined diameter.

Situated on an end of the outboard extent of each locking screw is a key hole 50 for allowing the transfer of the locking tabs between the retracted orientation and the extended orientation. In use, the inboard extents of the locking screws are adapted to be extended through the bores portions and holes of the frame and engaged with a vehicle. Thereafter, the locking tabs may be selectively extended to prevent the removal of the locking screws from the frame. This is accomplished by the locking tabs being moved to the extended orientation while within the frame. It is now apparent that the enlarged diameter of the apertures of the transparent plate is critical for accommodating the enlarged diameter or width of the locking screws. Ideally, an outboard end of the key hole is smooth for allowing the insertion of a screw driver or the like therein to facilitate initial engagement of the screw with the vehicle. As an option, radially extending slots may be formed in an inner perimeter of the apertures of the transparent plate in order to ensure that the locking screws may not be rotated with respect to the frame and vehicle for disengagement.

In order to accomplish the foregoing, the outboard extent of the locking screw may be equipped with a rotatable locking mechanism therein which has a pair of Z-shaped interconnects pivotally coupled thereto which are in turn integrally connected to the locking tabs. Such internal mechanism may work in a manner similar to the locking mechanism of FIG. 6 of U.S. Pat. No. 5,012,602 which is incorporated herein by reference. Of course, ratios and proportions of the outboard extent, locking mechanism, and key may be varied to accommodate such locking mechanism.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular license plate holder comprising, in combination:

a frame including a rear face with a substantially planar rectangular configuration defined by a front surface, a rear surface, and a periphery formed therebetween defined by a top edge, a bottom edge, and a pair of side edges, the frame further including a side wall integrally formed on the periphery of the rear face and extending forwardly therefrom for defining a bottom face and a pair of side faces forming an interior space and an open top, the frame further including an inwardly extending lip integrally formed on an outboard peripheral edge of the side wall and extending inwardly therefrom with an inboard peripheral edge defined by a linear bottom edge, a pair of linear side edges, and a top edge with a linear central extent and a pair of side extents each having a rectangular frame portion and a circular bore portion with a predetermined diameter, wherein the rear face of the frame has a pair of holes formed therein adjacent to the top edge of the rear face and in alignment with the bore portions of the inwardly extending lip of the frame;

a pair of divider strips each having a substantially planar rectangular configuration, each of the divider strips integrally formed on an inner surface of one of the side faces of the side wall with an inboard edge being coextensive with one of the side edges of the inwardly extending lip of the frame for defining a rear compartment adapted for removably receiving a license plate therein and a front compartment;

a transparent plate with a substantially planar rectangular configuration having a shape and a size similar to that of the rear face of the frame for being removably received within the front compartment of the frame;

a lid having a substantially planar rectangular configuration with a size and shape similar to that of the bottom face of the side wall of the frame, an elongated side edge of the lid being pivotally coupled to the top edge of the rear face of the frame for allowing selective access to the interior space of the frame; and a pair of locking screws each including a threaded substantially conical inboard extent and a substantially cylindrical outboard extent integrally coupled to the inboard extent in coaxial relationship therewith, the outboard extent having a pair of linear slots formed in diametrically opposed sides thereof, a pair of substantially planar triangular locking tabs slidably mounted within the slots of the outboard extent and movable within a plane including an axis of the outboard extent between a retracted orientation such that the outboard extent has an overall width of less than the predetermined diameter and an extended orientation such that the outboard extent has an overall width greater than the predetermined diameter, and a key hole situated on an end of the outboard extent for allowing the transfer of the locking tabs between the retracted orientation and the extended orientation, wherein the inboard extents of the locking screws are adapted to be extended through the bores portions and holes of the frame and engaged with a vehicle such that the locking tabs may be selectively extended to prevent the removal of the locking screws from the frame.

2. A vehicular license plate holder comprising:

a frame adapted for removably receiving a license plate, the frame having at least one hole formed therein alignable with a mounting aperture of a license plate when the license plate is received by the frame;

a transparent plate positioned on the frame; and at least one locking assembly for preventing the removal of the license plate from the frame;

wherein the at least one locking assembly includes:

a threaded inboard extent for threadedly engaging a hole in a portion of a vehicle;

an outboard extent for extending through the hole of the frame and a mounting aperture of the license plate mounted therein for resisting removal of the license plate from the frame;

at least one locking tab mounted on the outboard extent, the at least one locking tab being slidable with respect to the outboard extent such that the at least one locking tab is extendable from and retractable into the outboard extent; and a key hole mounted on an end of the outboard extent for actuate the at least one locking tab for selectively extending and retracting the at least one locking tab;

wherein the at least one locking tab prevents removal of the outboard extent from the hole in the frame and the mounting aperture of an inserted license plate when extended and permits removal of the outboard extent from the hole in the frame and the mounting aperture of an inserted license plate when retracted.

3. A vehicular license plate holder as set forth in claim 2 wherein the transparent plate is removably positioned within the frame.

4. A vehicular license plate holder as set forth in claim 2 wherein the frame includes a lid for allowing selective access to the license plate.

5. A vehicular license plate holder as set forth in claim 2 wherein the frame includes a side wall and an inwardly extending peripheral lip, the peripheral lip including a top extent with a frame portion for encompassing a rectangular part of a corner of the license plate.

6. A vehicular license plate holder as set forth in claim 2 wherein the frame has two holes for receiving locking assemblies, each of the holes being positioned to be alignable with one of the mounting apertures in a license plate, and wherein two locking assemblies are included such that each of the locking assemblies is positionable in one of the holes in the frame.

7. A vehicular license plate holder as set forth in claim 2 wherein the frame includes at least one license tag viewing windows, the viewing window being positioned at a corner of the frame.

8. A vehicular license plate holder as set forth in claim 7 wherein two license tag viewing windows are formed in the frame.

9. A vehicular license plate holder as set forth in claim 2 wherein at least two locking tabs are mounted on the outboard extent of the at least one locking assembly.

10. A vehicular license plate holder as set forth in claim 9 wherein the two locking tabs are extendable in diametrically opposite directions.

11. A vehicular license plate holder as set forth in claim 2 wherein the transparent plate is removably positioned in the frame;

wherein the frame includes a lid for allowing selective access to the license plate;

wherein the frame has two holes for receiving locking assemblies, each of the holes being positioned to be alignable with one of the mounting apertures in a license plate, and wherein two locking assemblies are included such that each of the locking assemblies is positionable in one of the holes in the frame;

wherein the frame includes two license tag viewing windows, the viewing windows each being positioned at a corner of the frame;

wherein two license tag viewing windows are formed in the frame;

wherein at least two locking tabs are mounted on the outboard extent of the at least one locking assembly; and wherein the two locking tabs are extendable in diametrically opposite directions.

* * * * *